(12) United States Patent
Pelizzoni et al.

(10) Patent No.: US 9,133,787 B2
(45) Date of Patent: Sep. 15, 2015

(54) METHOD FOR ESTIMATING AN INSTANTANEOUS PRESSURE VALUE IN A FUEL LINE OF A FUEL INJECTION SYSTEM

(75) Inventors: Ivan Pelizzoni, Turin (IT); Angelo Cancellieri, Citema (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 972 days.

(21) Appl. No.: 13/298,906

(22) Filed: Nov. 17, 2011

(65) Prior Publication Data

US 2012/0130620 A1   May 24, 2012

(30) Foreign Application Priority Data

Nov. 18, 2010   (GB) .................................. 1019504.8

(51) Int. Cl.
| | | |
|---|---|---|
| *G01M 15/00* | (2006.01) | |
| *F02D 41/40* | (2006.01) | |
| *F02M 45/02* | (2006.01) | |
| *F02M 63/02* | (2006.01) | |

(52) U.S. Cl.
CPC ...... *F02D 41/402* (2013.01); *F02D 2200/0602* (2013.01); *F02D 2250/04* (2013.01); *F02D 2250/31* (2013.01); *F02M 45/02* (2013.01); *F02M 63/0225* (2013.01); *Y02T 10/44* (2013.01)

(58) Field of Classification Search
CPC .............. F02D 41/3845; F02D 2200/0602; F02D 2250/31; F02D 41/3836; F02D 41/222; F02D 2041/224; F02D 2041/223; F02D 41/30; F02D 29/02; F02D 41/3005; F02D 28/00; F02M 63/0225; F02M 59/366; B60W 10/06
USPC ................. 123/458, 494; 73/114.43, 114.51; 701/102, 103, 104, 105
See application file for complete search history.

(56) References Cited

U.S. PATENT DOCUMENTS

| | | | |
|---|---|---|---|
| 6,102,009 A | 8/2000 | Nishiyama | |
| 6,311,669 B1 * | 11/2001 | Przymusinski et al. | 123/300 |
| 7,188,608 B2 * | 3/2007 | Wilson et al. | 123/456 |
| 7,287,515 B2 | 10/2007 | Okamura et al. | |
| 8,306,719 B2 * | 11/2012 | Ishizuka | 701/102 |
| 2003/0121501 A1 * | 7/2003 | Barnes et al. | 123/446 |
| 2009/0082941 A1 | 3/2009 | Nakata et al. | |
| 2009/0164094 A1 | 6/2009 | Geveci et al. | |
| 2010/0206269 A1 | 8/2010 | Cinpinski et al. | |

FOREIGN PATENT DOCUMENTS

| | | |
|---|---|---|
| EP | 0905359 A2 | 3/1999 |
| EP | 1741913 A2 | 1/2007 |

* cited by examiner

*Primary Examiner* — Hai Huynh
*Assistant Examiner* — Raza Najmuddin
(74) *Attorney, Agent, or Firm* — Ingrassia Fisher & Lorenz PC

(57) ABSTRACT

A method is provided for estimating an instantaneous pressure value $P_{inst}$ in a fuel line of a fuel injection system during a fuel multi-injection pattern. The method includes, but is not limited to determining a mean pressure value $\overline{P}$ inside the fuel line of the fuel injection system (15), and correcting the mean pressure value $\overline{P}$ with pressure contributions generated by the previous injections of the multi-injection pattern.

19 Claims, 3 Drawing Sheets ion No. 1019504.8, filed Nov. 18, 2010, which is incorporated herein by reference in its entirety.
METHOD FOR ESTIMATING AN INSTANTANEOUS PRESSURE VALUE IN A FUEL LINE OF A FUEL INJECTION SYSTEM

CROSS-REFERENCE TO RELATED APPLICATION

This application claims priority to British Patent Application No. 1019504.8, filed Nov. 18, 2010, which is incorporated herein by reference in its entirety.

TECHNICAL FIELD

The technical field relates to a method for estimating an instantaneous pressure value in a fuel line of a fuel injection system.

BACKGROUND

It is known that, in order to improve emissions and combustion noise in internal combustion engines, a multiple fuel injection pattern can be used for each cylinder, such pattern being substantially composed by splitting the requested fuel quantity into several injections that may occur before and after the Top Dead Center of the piston. In a multi-injection pattern, the opening and closing of the injector needle generates a pressure wave that propagates along the fuel line. When a multi injection pattern is adopted, such fluctuations strongly affect the fuel delivery rate of the successive injection pulses and therefore may have a negative impact on emission levels and fuel consumption. In fact, the accuracy of the injected quantity in a multi-injection pattern is affected by the effect of the pressure wave in the fuel line: this wave represents the effect of a physical phenomenon known in hydraulics as water hammer.

A first approach known in the prior art to minimize such problem is the use of hydraulic systems designed and built specifically to compensate the pressure wave effect, for example by modifying physically the fuel line in order to decrease the wave pressure phenomena by introducing accurate holes or modifying the shape of the fuel accumulator. This approach is limited by the fact that it needs a specific modification of the fuel line for every engine system.

A second approach is the use of modified injectors that reduce the wave pressure effect using a specific damping volume inside the injector itself. However, this approach requires modifications to the injectors.

A further approach is to use a mapping of the effect of the pressure wave in order to apply a control strategy to compensate the injected quantity of the pulses that endure the wave pressure effect. This approach has the problem that it needs a different, complex map for every different engine system. In fact, the injected quantity in an injection belonging to a multi-injection pattern depends on the instantaneous value of the fuel line pressure and therefore the more accurate is the estimation of such value, the more accurate is the injection.

In view off the foregoing, at least one object is thus to obtain a reliable estimation of the instantaneous pressure value in the fuel line of a fuel injection system. At least a further object is to minimize the impact of the pressure fluctuations inside the fuel line on the injected quantity of each single pulse in a multi-injection pattern. At least another object is to provide the possibility of minimize the impact of the pressure fluctuations inside the fuel line without the need to modify mechanically the injector and/or the fuel line itself. At least another object is to provide an estimation of the pressure wave effect in a multi-injection pattern without using complex devices and by taking advantage from the computational capabilities of the Electronic Control Unit (ECU) of the vehicle. In addition, other objects, desirable features, and characteristics will become apparent from the subsequent summary and detailed description, and the appended claims, taken in conjunction with the accompanying drawings and this background.

SUMMARY

An embodiment provides a method for estimating an instantaneous pressure value $P_{inst}$ in a fuel line of a fuel injection system during a fuel multi-injection pattern. The method comprising the steps of determining a mean pressure value $\overline{P}$ inside the fuel line (of the fuel injection system, correcting the mean pressure value $\overline{P}$ with pressure contributions generated by the previous injections of the multi-injection pattern. This embodiment allows to reliably taking into account the deviation from a mean pressure value in the fuel line of an injector in a fuel injection system for an Internal Combustion Engine due to different injections during a multi-injections pattern.

According to a further embodiment, the instantaneous pressure value is estimated by means of the following equation:

$$P_{inst} = \overline{P} + K \cdot \sum_{i=1}^{n} A_i \cdot e^{-Bt} \cdot \cos(2\pi \cdot f_i \cdot t + \varphi_i) \qquad (1)$$

Where the parameter K represents a proportionality factor, B a damping factor, $A_i$ represents the amplitude of the pressure wave generated by pulse $Q_i$ in the multi-injection pattern, $f_i$ represents the frequency of the pressure wave generated by pulse $Q_i$, $\varphi_i$ represents the phase of the pressure wave generated by pulse $Q_i$ and n the number of pulses in the multi-injection pattern preceding time t. This embodiment provides a model for the pressure wave phenomenon in the fuel line, thereby increasing the accuracy of the estimation.

A further embodiment provides for a method for operating a fuel injector of a fuel injection system activated with a multi-injection pattern, the method comprising estimating an instantaneous pressure value in a fuel line of the fuel injection system during the multi-injection pattern using pressure contributions generated by previous injections of the multi-injection pattern, and using the estimated instantaneous pressure value to determine the injection parameters. This embodiment allows improving the injection actuation accuracy in a multi-injection pattern system, by using the proper pressure value present in the fuel line to calculate all injection parameters.

According to still a further embodiment, the phase of estimation of the instantaneous pressure value is performed only in case the mean pressure in the fuel line, the time interval between two consecutive pulses, the engine speed or the engine temperature are inside a respective predetermined range. This embodiment avoids a recalculation of the pressure value estimation in cases in which a precise instantaneous pressure value is not necessary to manage the injection.

In still a further embodiment, the injection parameter is the time of opening of an injector in the fuel injection system. This embodiment allows improving the injection accuracy.

A further embodiment provides for method in which only the pressure contribution generated by the previous injection, which is only the preceding injection, of the multi-injection pattern is used for correcting the mean pressure value $\overline{P}$ inside the fuel line. This embodiment simplifies the calculations needed by taking advantage of the observation that, in a multi-injection pattern, each pressure wave due to a single injection has a substantial effect only on the subsequent pulse.

The methods described above may be carried out with the help of a computer program comprising a program code or computer readable instructions for carrying out all the method steps described above. The computer program can be stored on a data carrier, also called computer readable medium or storage unit, to represent a computer program product. The storage unit may be a CD, DVD, a hard disk, a flash memory, or the like. The computer program can be also embodied as an electromagnetic signal, said signal being modulated to carry a sequence of data bits which represent a computer program to carry out all steps of the methods. The computer program may reside on or in a data carrier, e.g., a flash memory, which is data connected with a control apparatus for an internal combustion engine. The control apparatus has a microprocessor that receives computer readable instructions in form of parts of the computer program and executes them. Executing these instructions amounts to performing the steps of the method as described above, either wholly or in part.

The electronic control apparatus can be a dedicated piece of hardware such as the ECU, which is commercially available and thus known in the art, or can be an apparatus different from such an ECU, e.g., an embedded controller. If the computer program is embodied as an electromagnetic signal as described above, then the ECA, e.g., the ECU, has a receiver for receiving such a signal or is connected to such a receiver placed elsewhere. The signal may be transmitted by a programming robot in a manufacturing plant. The bit sequence carried by the signal is then extracted by a demodulator connected to the storage unit, after which the bit sequence is stored on or in said storage unit of the ECA.

An apparatus is also provided for estimating an instantaneous pressure value $P_{inst}$ in a fuel line of a fuel injection system during a fuel multi-injection pattern. The apparatus comprises means for determining a mean pressure value $\overline{P}$ inside the fuel line of the fuel injection system and means for correcting the mean pressure value $\overline{P}$ with pressure contributions generated by the previous injections of the multi-injection pattern. Such an apparatus allows reliably taking into account the deviation from a mean pressure value in the fuel line of an injector in a fuel injection system for an Internal Combustion Engine due to different injections during a multi-injections pattern.

An embodiment of said apparatus is configured to estimate the instantaneous pressure value by means of the following equation:

$$P_{inst} = \overline{P} + K \cdot \sum_{i=1}^{n} A_i \cdot e^{-Bt} \cdot \cos(2\pi \cdot f_i \cdot t + \varphi_i) \quad (1)$$

Where the parameter K represents a proportionality factor, B a damping factor, $A_i$ represents the amplitude of the pressure wave generated by pulse $Q_i$ in the multi-injection pattern, $f_i$ represents the frequency of the pressure wave generated by pulse $Q_i$, $\varphi_i$ represents the phase of the pressure wave generated by pulse $Q_i$ and n the number of pulses in the multi-injection pattern preceding time t. This embodiment provides a model for the pressure wave phenomenon in the fuel line, thereby increasing the accuracy of the estimation.

Another embodiment relates to an apparatus for operating a fuel injector of a fuel injection system activated with a multi-injection pattern, henceforth called operating apparatus. This apparatus comprises means for estimating an instantaneous pressure value $P_{inst}$ in a fuel line of the fuel injection system during the multi-injection pattern as described above, and means for using the estimated instantaneous pressure value $P_{inst}$ to determine an injection parameter. This embodiment provides an apparatus with improved actuation accuracy in a multi-injection pattern system, the improved accuracy resulting from using the proper pressure value present in the fuel line to calculate all injection parameters.

An embodiment of the operating apparatus is configured to estimate the phase of the instantaneous pressure value $P_{inst}$ only in case the mean pressure in the fuel line, the time interval between two consecutive pulses, the engine speed or the engine temperature are inside a respective predetermined range. Another embodiment of the operating apparatus is configured to avoid a recalculation of the pressure value estimation in cases in which a precise instantaneous pressure value is not necessary to manage the injection.

Still another embodiment of the operating apparatus is configured to use the time of opening of an injector in the fuel injection system as the injection parameter. This embodiment allows improving the injection accuracy.

Another embodiment of the operating apparatus is configured to use only the pressure contribution generated by the previous injection of the multi-injection pattern for correcting the mean pressure value $\overline{P}$ inside the fuel line. This embodiment simplifies the calculations needed by taking advantage of the observation that, in a multi-injection pattern, each pressure wave due to a single injection has a substantial effect only on the subsequent pulse.

A still embodiment provides an internal combustion engine specially arranged for carrying out the method claimed.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
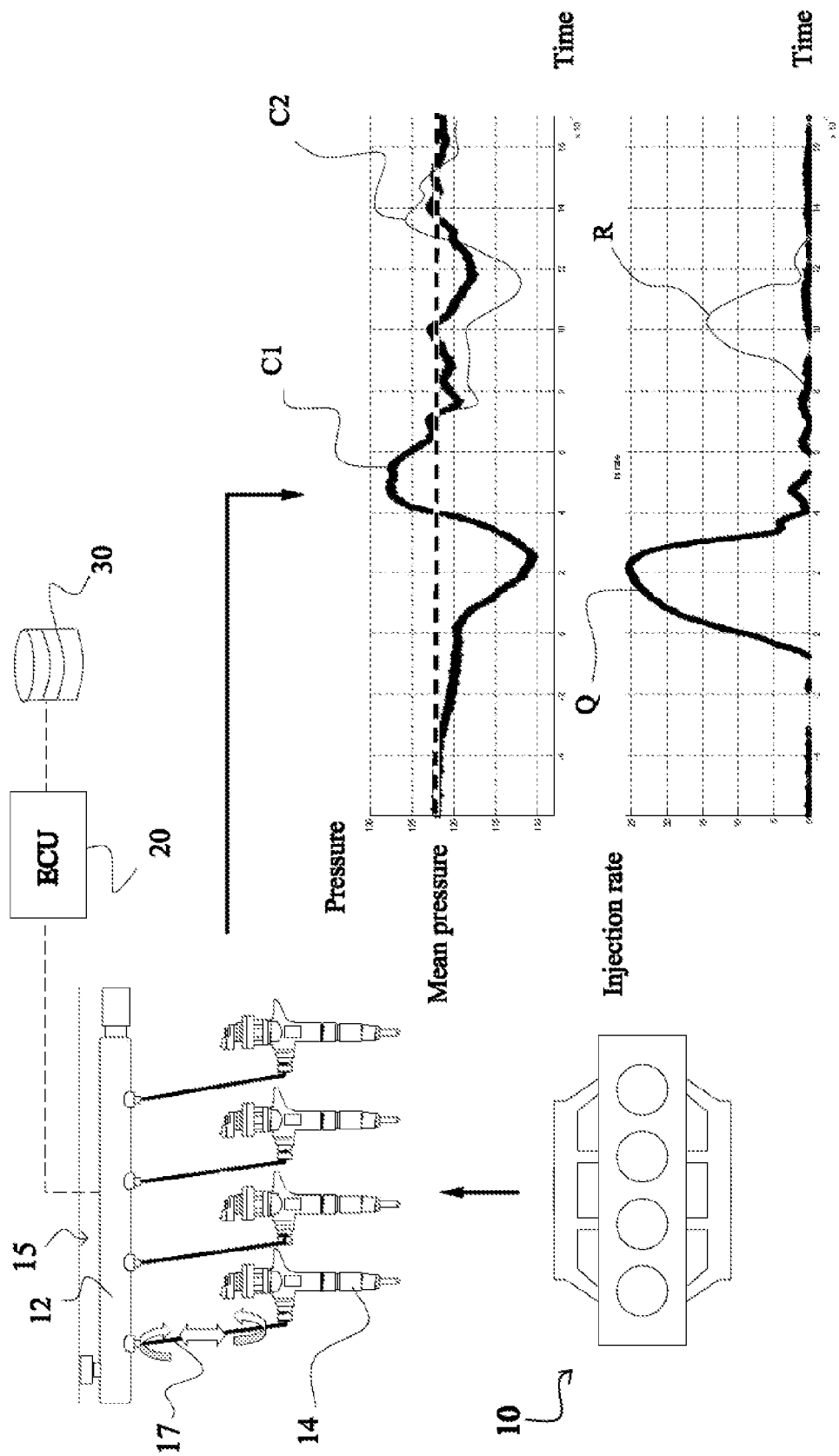
FIG. 1 is a schematic representation of a fuel injection line of an internal combustion engine and of the effect of a two-pulse injection on the rail pressure.

FIG. 1 shows an internal combustion engine 10 managed by an engine Electronic Control Unit (ECU) 20 equipped with a data carrier 30, the internal combustion engine 10 equipped with a fuel injection system 15 having a fuel pressure common rail 12 and injectors 14, each injector 14 being connected to the common rail 12 by a respective fuel line 17. The pressure in the fuel line 17 is used to determine the injection parameters to be actuated in order to drive injectors 14. A single pulse Q actuation determines a fuel fluctuation in the fuel line 17 that generates a fuel pressure wave C1, as schematically depicted in FIG. 1.

As a matter of fact, when the fuel injection system 15 is operated according to a multi-injection pattern comprising more than one injection pulses, the instantaneous pressure value $P_{inst}$ due to pulses actuated after the first one shows a high spread compared with the mean pressure value $\overline{P}$, this latter being measured by a pressure sensor and commonly used to control the injection. This behavior is due to the effect produced by the previous pulse actuation that generates the already mentioned pressure wave in the fuel line: this different pressure compared to the mean pressure value $\overline{P}$ affects the following pulses actuation leading to incorrect injection quantities. In FIG. 1, a fuel pressure wave C2 is also depicted in order to show the effect on the pressure instantaneous value in the fuel line 17 of a second pulse R successive to pulse Q.

Figure 2:
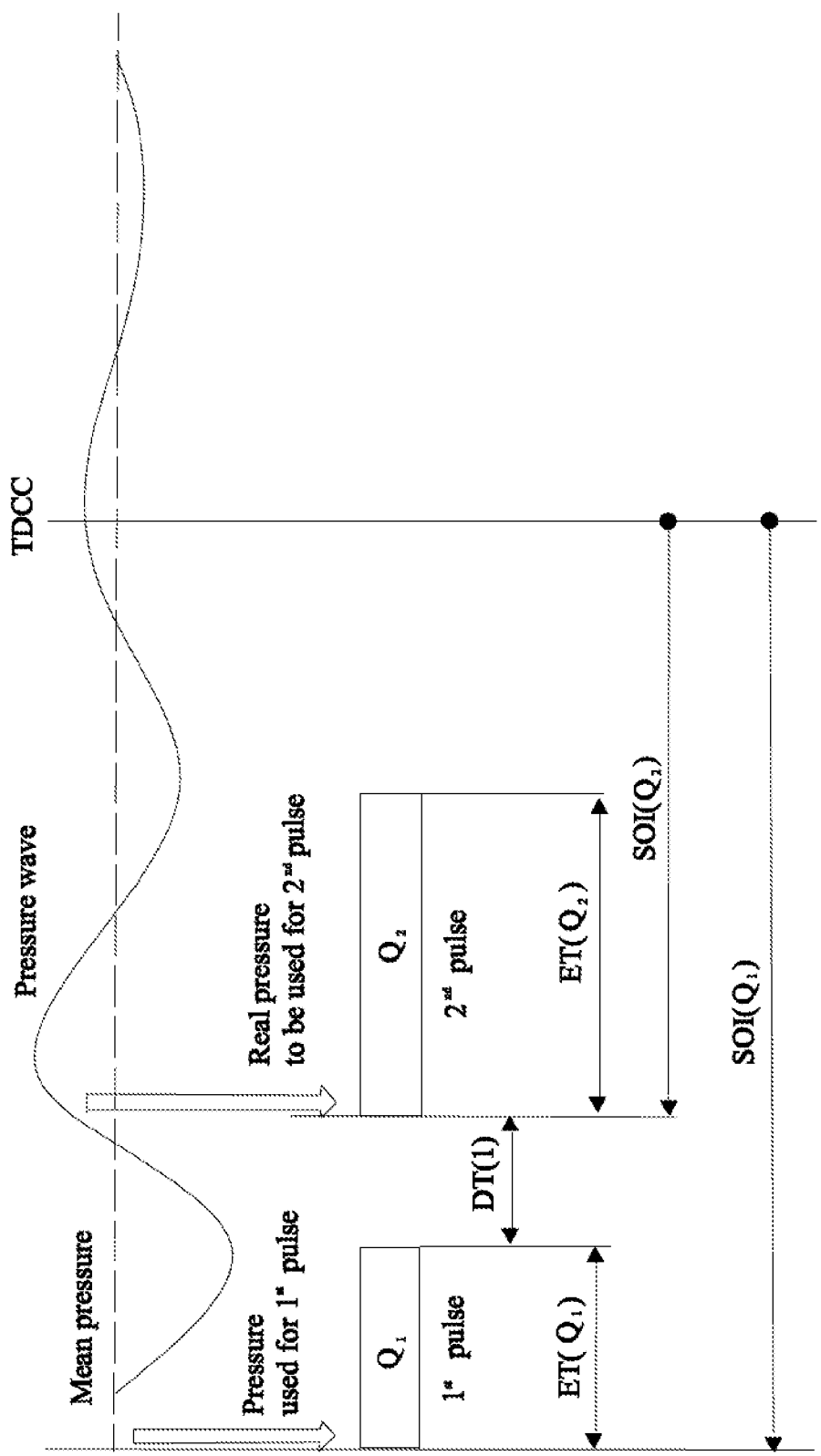
FIG. 2 is a representation of two consecutive pulses in a multi-injection pattern with using of method of the disclosure.

FIG. 2 represents an example of a generic two-pulse injection pattern in an internal combustion engine performed using the method of an embodiment. In FIG. 2 basic injection parameters are shown, namely ET ($Q_1$) indicates the time period of a first pulse $Q_1$ and ET ($Q_2$) indicates the time period of a second pulse $Q_2$, successive to pulse $Q_1$, DT(1) indicates the time interval between pulse $Q_1$ and pulse $Q_2$. In addition, SOI ($Q_1$) indicates Start of Injection for pulse $Q_1$ and SOI ($Q_2$) indicates Start of Injection for pulse $Q_2$, while TDCC indicates Top Dead Center Compression for the relative piston. In a two-pulse injection pattern, the actuation of pulse $Q_1$ generates a pressure disturbance in the fuel line that is represented as a pressure wave in the higher portion of FIG. 2. Because of this wave, the pressure available to be used for the actuation of the following pulse $Q_2$ is generally different from the pressure mean value. The above-described approach allows to estimate the instantaneous value of this different pressure and to use it as the main input to calculate all injection parameters related to pulse $Q_2$.

Figure 3:
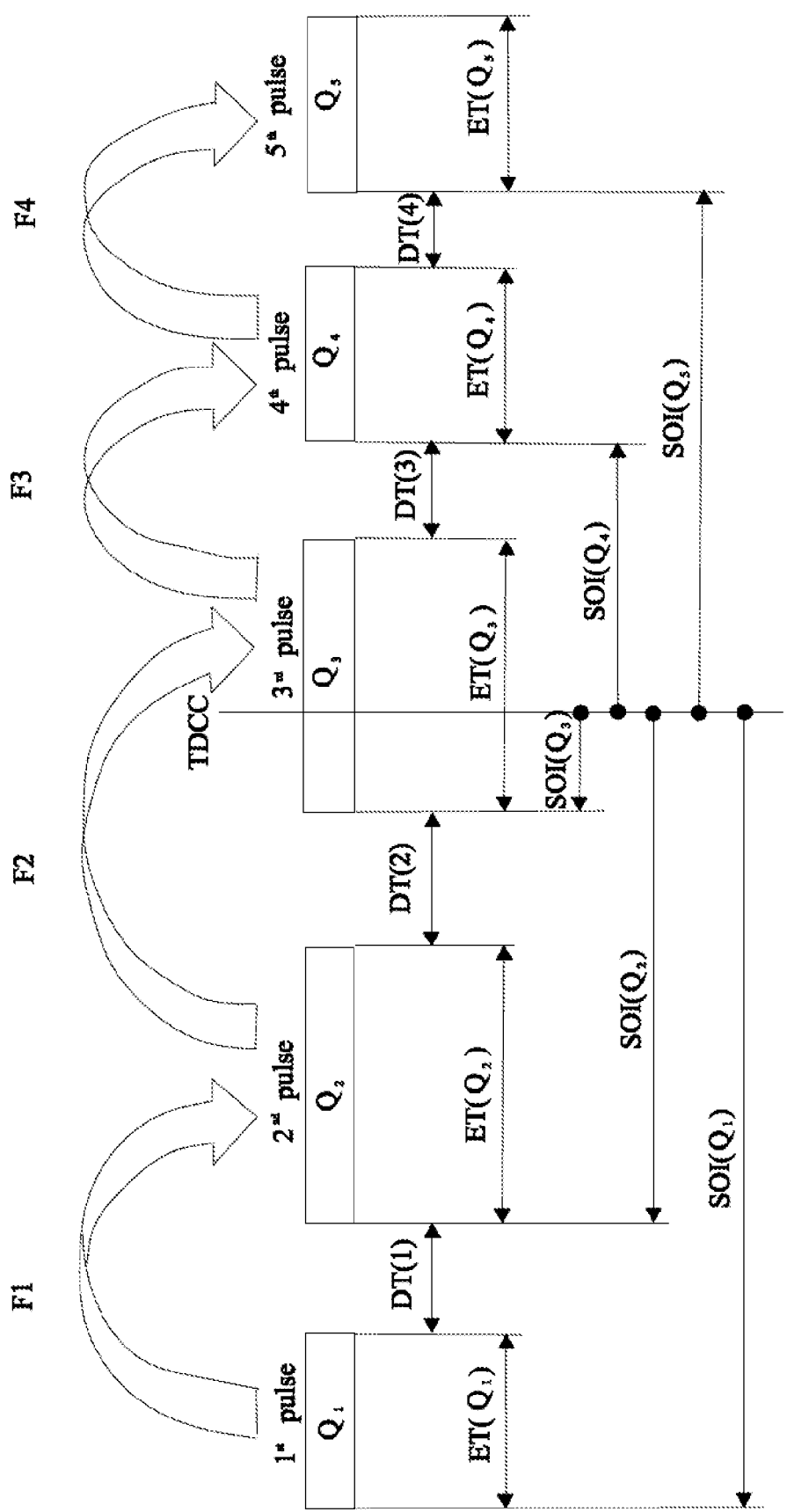
FIG. 3 is a representation of a series of consecutive pulses in a multi-injection pattern.

The pressure wave behavior concept can be extended to a generic multi-pulses injection pattern, such as depicted in FIG. 3. Each pulse generates a pressure wave that influences potentially all following pulses, as exemplified by arrows F1-F4. On the other hand, experimental tests showed that each pressure wave has a real effect on the consecutive pulse only. Namely, the pressure wave created by pulse $Q_1$ actuation has an impact on pulse $Q_2$ only, while the wave generated by pulse $Q_2$ affects pulse $Q_3$ only, and so on for all other pulses $Q_4$ and $Q_5$.

Since injector needle opening and closing generates under and over pressure in the high-pressure pipeline, and the propagation or sound speed inside the fuel line is known, the pressure wave behavior can be predicted and calculated by the Electronic Control Unit 20 of the engine 10. Then, by applying the value found, it is possible to improve the accuracy of the injection. The wave compensation is calculated in terms of the differential pressure to be applied to the affected injection pulse in addition to the measured mean pressure.

The pressure wave can be mathematically approached as a double harmonic trigonometric function and its compensation must be applied separately for each pulse. The compensation is applied in defined ranges of mean pressure, time interval between consecutive pulses, engine speed, and environmental conditions (e.g. engine temperature).

According to an embodiment, the generic pressure wave can be mathematically expressed as a multi-harmonic trigonometric function described hereinafter in Eq. (1):

$$P_{inst} = \overline{P} + K \cdot \sum_{i=1}^{n} A_i \cdot e^{-Bt} \cdot \cos(2\pi \cdot f_i \cdot t + \varphi_i) \qquad (1)$$

The formula parameters have the following meaning $P_{inst}$=Instantaneous pressure to be used for the calculation of injection parameters of the pulse that endures the wave pressure effect from the previous actuated pulse $\overline{P}$=Mean pressure, K=Proportionality factor, $A_i$=Amplitude of the wave generated by pulse $Q_i$, B=Damping factor, t=Time, $f_i$=Frequency of the wave generated by pulse $Q_i$, $\varphi_i$=Phase of the wave generated by pulse $Q_i$.

The pressure calculated using the formula above described is used to determine the proper injection parameters in terms of the time ET of the pulse that endures the wave pressure created by previous one. In a two pulses actuation pattern, as expressed for example in FIG. 2, the situation appears schematically as follows: Pulse $Q_1$ generates the wave pressure effect, while pulse $Q_2$ endures it.

A formula that can be employed in a two pulses pattern to obtain the instantaneous pressure to be used for the calculation of injection parameters of the pulse R can be formalized as follows:

$$P_{inst} = \overline{P} + K \cdot \sum_{i=1}^{n} A_i \cdot e^{-Bt} \cdot \cos(2\pi \cdot f_i \cdot t + \varphi_i)$$

Where $\overline{P}$=Mean pressure, K=Proportionality factor, $A_i$=Amplitude of the wave generated by pulse $Q_i$, B=Damping factor, t=Time, $f_i$=Frequency of the wave generated by pulse $Q_i$, $\varphi_i$=Phase of the wave generated by pulse $Q_i$. Since in this case n can be 1 or 2 the formula can be expressed in the following way:

$$P_{inst} = \overline{P} + K \cdot \sum_{i=1}^{n} A_i \cdot e^{-B_i t} \cdot \cos(2\pi \cdot f_i \cdot t + \varphi_i) =$$
$$\overline{P} + K \cdot [A_1 \cdot e^{-B_1 t} \cdot \cos(2\pi \cdot f_1 \cdot t + \varphi_1) + A_2 \cdot e^{-B_2 t} \cdot \cos(2\pi \cdot f_2 \cdot t + \varphi_2)],$$

Where $A_1$ and $A_2$ represent amplitudes respectively of the waves generated by pulses $Q_1$ and $Q_2$, $-f_1$ and $f_2$ represent frequency respectively of the waves generated by pulses $Q_1$ and $Q_2$, and $-f_1$ and $f_2$ represent the phases of the waves generated by pulses $Q_1$ and $Q_2$.

The pressure $P_{inst}$ is used to calculate the injection parameters for pulse $Q_2$. In this way, pulse $Q_2$ actuation is more precise and closer to the real system conditions. The value of the mean pressure $\overline{P}$ may be obtained by a pressure sensor in the fuel line 17. The same formula may be used in case of three or more pulses injection configuration. The wave pressure effect compensation is applied every two consecutive pulses in the sense that one first pulse generates the pressure wave and the consecutive second pulse endures it. The complete mathematical formula is calculated only in case input parameters are inside certain functional ranges: for example, mean pressure or other environmental parameters must be inside specific window ranges to enable the formula calculation and so to get the whole pressure compensation.

This embodiment allows improving the injection actuation accuracy in a multi-injection pattern system, by using the proper pressure value present in the system to calculate all injection parameters in all injections of a multi-injection pattern system. The above method allows to compensate the pressure wave effect and avoid that the injection actuation to be negatively affected. Moreover, by using the explained pressure wave compensation strategy, calibration activity will have more flexibility in terms of dwell time setting: this allows ignoring limitations due to no-reliability of injected quantities by varying the dwell time and to focus the effort on engine performances purposes such as, for example, emissions, drivability, and NVH (Noise Vibration and Harshness).

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for estimating an instantaneous pressure value $P_{inst}$ in a fuel line of a fuel injection system during a fuel multi-injection pattern, comprising:
   determining a mean pressure value $\overline{P}$ inside the fuel line of the fuel injection system; and
   correcting the mean pressure value $\overline{P}$ with pressure contributions generated by the previous injections of the fuel multi-injection pattern to obtain an instantaneous pressure value $P_{inst}$; and
   controlling the fuel injection system based on the instantaneous pressure value $P_{inst}$.

2. The method according to claim 1, wherein the instantaneous pressure value is estimated according to:

$$P_{inst} = \overline{P} + K \cdot \sum_{i=1}^{n} A_i \cdot e^{-Bt} \cdot \cos(2\pi \cdot f_i \cdot t + \varphi_i),$$

wherein the parameter K represents a proportionality factor, B a damping factor, $A_i$ represents an amplitude of the pressure wave generated by pulse $Q_i$ in the fuel multi-injection pattern, $f_i$ represents a frequency of the pressure wave generated by pulse $Q_i$, $\phi_i$ represents the phase of the pressure wave generated by pulse $Q_i$ and n the number of pulses in the fuel multi-injection pattern preceding time t.

3. The method according to claim 1, further comprising using the instantaneous pressure value $P_{inst}$ to determine an injection parameter.

4. The method according to claim 3, wherein the phase of estimation of the instantaneous pressure value $P_{inst}$ is performed only in case the mean pressure in the fuel line, the time interval between two consecutive pulses, an engine speed or an engine temperature are inside a respective predetermined range.

5. The method according to claim 3, wherein the injection parameter is the time of opening of an injector in the fuel injection system.

6. The method according to claim 3, wherein only the pressure contribution generated by the previous injection of the fuel multi-injection pattern is used for correcting the mean pressure value $\overline{P}$ inside the fuel line.

7. An internal combustion engine, comprising:
   a fuel injection system; and
   an electronic control unit configured to estimate an instantaneous pressure value $P_{inst}$ in a fuel line of the fuel injection system during a fuel multi-injection pattern, the electronic control unit configured to estimate the instantaneous pressure value $P_{inst}$ by:
   determining a mean pressure value $\overline{P}$ inside the fuel line of the fuel injection system; and
   correcting the mean pressure value $\overline{P}$ with pressure contributions generated by the previous injections of the fuel multi-injection pattern to obtain an instantaneous pressure value $P_{inst}$; and
   controlling the fuel injection system based on the instantaneous pressure value $P_{inst}$.

8. The internal combustion engine according to claim 7, wherein the instantaneous pressure value is estimated according to:

$$P_{inst} = \overline{P} + K \cdot \sum_{i=1}^{n} A_i \cdot e^{-Bt} \cdot \cos(2\pi \cdot f_i \cdot t + \varphi_i),$$

wherein the parameter K represents a proportionality factor, B a damping factor, $A_i$ represents an amplitude of the pressure wave generated by pulse $Q_i$ in the fuel multi-injection pattern, $f_i$ represents a frequency of the pressure wave generated by pulse $Q_i$, $\phi_i$ represents the phase of the pressure wave generated by pulse $Q_i$ and the number of pulses (n) in the fuel multi-injection pattern preceding time t.

9. The internal combustion engine according to claim 7, the electronic control unit is further configured to use the instantaneous pressure value $P_{inst}$ to determine an injection parameter.

10. The internal combustion engine according to claim 9, wherein the phase of estimation of the instantaneous pressure value $P_{inst}$ is performed only in case the mean pressure in the fuel line, the time interval between two consecutive pulses, an engine speed or an engine temperature are inside a respective predetermined range.

11. The internal combustion engine according to claim 9, wherein the injection parameter is the time of opening of an injector in the fuel injection system.

12. The internal combustion engine according to claim 9, wherein only the pressure contribution generated by the previous injection of the fuel multi-injection pattern is used for correcting the mean pressure value $\overline{P}$ inside the fuel line.

13. The internal combustion engine according to claim 7, wherein the internal combustion engine is a diesel engine.

14. A non-transitory computer readable medium embodying a computer program product, the computer program product, comprising:
   an estimation program for estimating an instantaneous pressure value $P_{inst}$ in a fuel line of a fuel injection system during a fuel multi-injection pattern, the estimation program configured to:
   determine a mean pressure value $\overline{P}$ inside the fuel line of the fuel injection system; and
   correct the mean pressure value $\overline{P}$ with pressure contributions generated by the previous injections of the fuel multi-injection pattern to obtain an instantaneous pressure value $P_{inst}$; and
   control the fuel injection system based on the instantaneous pressure value $P_{inst}$.

15. The computer readable medium embodying the computer program product according to claim 14, wherein the instantaneous pressure value is estimated according to:

$$P_{inst} = \overline{P} + K \cdot \sum_{i=1}^{n} A_i \cdot e^{-Bt} \cdot \cos(2\pi \cdot f_i \cdot t + \varphi_i),$$

and wherein the parameter K represents a proportionality factor, B a damping factor, $A_i$ represents an amplitude of the pressure wave generated by pulse $Q_i$ in the fuel multi-injection pattern, $f_i$ represents a frequency of the pressure wave generated by pulse $Q_i$, $\phi_i$ represents the phase of the pressure wave generated by pulse $Q_i$ and the number of pulses (n) in the fuel multi-injection pattern preceding time t.

16. The computer readable medium embodying the computer program product according to claim 14, further comprising using the instantaneous pressure value $P_{inst}$ to determine an injection parameter.

17. The computer readable medium embodying the computer program product according to claim 16, wherein the phase of estimation of the instantaneous pressure value $P_{inst}$ is performed only in case the mean pressure in the fuel line, the time interval between two consecutive pulses, an engine speed or an engine temperature are inside a respective predetermined range.

18. The computer readable medium embodying the computer program product according to claim 16, wherein the injection parameter is the time of opening of an injector in the fuel injection system.

19. The computer readable medium embodying the computer program product according to according to claim 16, wherein only the pressure contribution generated by the previous injection of the fuel multi-injection pattern is used for correcting the mean pressure value $\overline{P}$ inside the fuel line.

* * * * *